United States Patent
Richard et al.

(10) Patent No.: US 9,529,911 B2
(45) Date of Patent: Dec. 27, 2016

(54) BUILDING OF A WEB CORPUS WITH THE HELP OF A REFERENCE WEB CRAWL

(71) Applicant: EXALEAD SA, Paris (FR)

(72) Inventors: Sebastien Richard, Paris (FR); Xavier Grehant, Paris (FR); Jim Ferenczi, Paris (FR)

(73) Assignee: Dassault Systemes, Velizy-Villacoublay (FR)

( * ) Notice: Subject to any disclaimer, the term of this patent is extended or adjusted under 35 U.S.C. 154(b) by 180 days.

(21) Appl. No.: 13/860,923

(22) Filed: Apr. 11, 2013

(65) Prior Publication Data
US 2013/0275406 A1    Oct. 17, 2013

(30) Foreign Application Priority Data
Apr. 12, 2012 (EP) ................................ 12305432

(51) Int. Cl.
G06F 7/00 (2006.01)
G06F 17/30 (2006.01)

(52) U.S. Cl.
CPC ................ *G06F 17/30864* (2013.01)

(58) Field of Classification Search
None
See application file for complete search history.

(56) References Cited

U.S. PATENT DOCUMENTS 8,346,755 B1 * 1/2013 Kapoor ............ G06F 17/30864
  707/710
2009/0287684 A1 * 11/2009 Bennett ........................... 707/5

OTHER PUBLICATIONS

International Search Report for EP 12 30 5432 dated Jul. 24, 2012.
Cho, J., et al "Parallel Crawlers" Proceedings of the 11th International Conference on World Wide Web, May 11, 2002.
Mclearn, G. "Autonomous Cooperating Web Crawlers". pp. 1-105 etd.uwaterloo.ca/etd/glmclearn2002; retrieved Jul. 23, 2012.
Baroni, Marco, "A Quick Guide To Building Your Own Specialized Corpus From The Web", 6 pages; http://sslmit.unibo.it/~dsmiraglio/procedura_BootCat.html_; Retrieved Sep. 29, 2015.
Novak, Blaž, "A Survey of Focused Web Crawling Algorithms", Proceedings of SIKDD 5558 (2004).
Chakrabarti, et al., "Focused Crawling: A New Approach to Topic-Specific Web Resource Discovery", 18 pages; https://web.archive.org/web/20040317210216/http://www.fxpal.com/people/ydberg/pubs/www8/www1999f.pdf; Retrieved Sep. 29, 2015.
(Continued)

*Primary Examiner* — Thu Nga Nguyen
(74) *Attorney, Agent, or Firm* — Hamilton, Brook, Smith & Reynolds, P.C.

(57) ABSTRACT

Computer-implemented method for building a web corpus (WCD) comprising the steps of: sending by a web crawler (WC) a query to a reference web crawl agent (RWCA), this query containing a least one identifier of a resource, receiving by the web crawler (WC) a response from the reference web crawl agent (RWCA); if this response does not contain the resource identified by the identifier, downloading by the web crawler (WC) the resource from the website (WS) corresponding to the identifier and adding the resource to the web corpus (WCD; and if this response contains the resource identified by the identifier, adding the resource to the web corpus (WCD).

7 Claims, 3 Drawing Sheets

(56) References Cited

OTHER PUBLICATIONS

Chakrabarti, Soumen, "Mining the Web", 364 pages; http://read.pudn.com/downloads75/ebook/275001/Morgan%20Kaufmann%20%20Mining%20the%20Web%20-%20Discovering%20Knowledge%20from%20Hypertext%20Data.pdf; Retrieved Sep. 29, 2015.
Jasani, Bhavin M., "Analyzing Different Web Crawling Methods", International Journal of Computer Applications (0975-8887), vol. 107—No. 5, Dec. 2014.
Kobayashi, et al., "Information Retrieval on the Web", ACM Computing Surveys, vol. 32—No. 2, Jun. 2000.
Lawrence, et al. "Accessibility of Information on the Web", Nature, vol. 400, pp. 107-109, Jul. 8, 1999.
Taubes, Gary, "Indexing the Internet", 269: 1354-1356, Sep. 8, 1995.

\* cited by examiner

BUILDING OF A WEB CORPUS WITH THE HELP OF A REFERENCE WEB CRAWL

RELATED APPLICATION(S)

This application claims priority under 35 U.S.C. §119 or 365 to European, Application No. 12305432.2, filed Apr. 12, 2012.

The entire teachings of the above application(s) are incorporated herein by reference.

FIELD OF THE INVENTION

The present invention relates to the field of network information software and in particular, to methods and systems for retrieving data from the Internet like those known as "web crawlers", in order to build a corpus.

BACKGROUND OF THE INVENTION

The WWW (World Wide Web) can be considered as a huge data repository which is tremendously considered as having a very important business value. It is therefore needed to provide companies active in the internet field with tools to create this value out the resources available on the web. These companies may provide services dedicated to individual users (like search engines, for instance) or to other companies in a BtoB (business to business) model, like gathering of marketing data in particular business field, etc.

In order to be able to analyze information and to valorize it, a first and mandatory step is to retrieve information available on the web, and to build from them a "web corpus", i.e. a set of resources on which dedicated computer programs will be run. These web corpuses may be generalist as in the case of a generic search engine, or more narrowed to a given business area or thematic.

Retrieving information, e.g. resources (web pages, multimedia files, etc.), from the web is a time-consuming task. The delay to retrieve a single resource may take hundreds of milliseconds to seconds. This delay is also unpredictable as it depends on the health of the website and of the underlying communication networks.

Also, there is no global view of the resources available on the web. So, in order to build this view, for instance to reply to a query inputted by a user of a search engine, there is a need to perform an iterative process by visiting first resources, and then visiting resources which are referred to in these resources, etc. until it is considered to have got a sufficient view of the web.

In doing this process, the delays are accumulated and the final delay to be able to answer user's request is not reasonable.

Web crawlers have been introduced to avoid this delay to search engines or any other computer programs that need to access a large number of resources.

Web crawlers are programs used to find, explore and download resources available on websites of the Web so as to constitute a corpus, i.e. a set of resources that could be used by other programs. They are also called ants, bots, web spiders . . . . In the following, they will be referred to as "web crawlers" or more simply as "crawlers".

More precisely and in general, a crawler starts with a list of URLs (Unified Resource Locators) to visit, called "seeds". As the crawler visits the resources identified by these URLs, it identifies all the URLs contained by the resource (in the form of hyperlinks) and adds them to the list of URLs to visit. These URLs are then recursively visited, while the corresponding resources are downloaded to progressively build a web crawl.

A web crawl is here defined as the digital contents stored by the web crawler.

These web crawlers are prominently used by search engines, like shown in FIG. 1.

A web crawler WC crawls the Web and builds a web crawl WCD, which is a repository of downloaded resources. An indexing program IDP is using this web crawl WCD in order to build an index ID.

This indexing program IDP may comprise a processing pipeline aiming at analyzing the raw resources of the web crawl WCD to transform them in "objects" compliant with a format more adapted for indexing. For instance, it may suppress parts of the content of certain downloaded resources (like advertisement banners, images, etc.) and/or look for certain data inside the downloaded resources to put them in specific fields of the objects to be indexed, etc.

The indexing program IDP also processes the "objects" or the raw resources to store items associated to them so as to fasten treatment of queries.

When a user U initiates a query with a search engine SE, it looks into the index ID to retrieve items which match the criteria of the query. These items are then presented to the user U, who can then choose to download or not the resources corresponding to the presented items (for instance by clicking on a hyperlink associated with an item).

The web crawl WCD can also be used by other computer programs Prog, such as batch analysis programs, for instance by means of graph modeling.

Therefore, Web crawlers enable to decouple resources retrieval from processing and applications. Delays due to resource retrieval from the web do not impact the responsiveness of the computer programs Prog, SE, nor the real-time syntheses of the index ID. The delays only impact the information available at a certain time (i.e. the downloaded resources). More specifically, they affect the time for a change on the corpus (new resource, deleted resource or modified resource) to be visible on the index ID.

It means that applications are not directly dependent on the scheduling of the resource retrieval task performed by the crawler. Delays and time constraints linked to this task may only impact the amount of information (i.e. downloaded resources) available at a certain time, as well as its age and freshness.

It also means that web crawlers can constitute meta-data over the data downloaded from the web. More precisely, a single index field may require information that is not found on a single resource, but is provided by the analyses of multiple resources. In addition, the PageRank algorithm of the company Google uses a graph representation of the hyperlinks between resources. Building this graph requires an examination of every resource of the corpus.

In general, the construction of an index requires multiple accesses to the same resource. Without a web crawl, the delay to retrieve a resource from the web will be felt several times.

Also, it is sometimes needed to change the structure of the index, in part or entirely. In order to avoid the delays of resource retrieval, the indexing program IDP can use the downloaded resources available in the web crawl WCD instead of downloading them from the web.

Despite this decoupling, the delays involved in the web crawling task remain a bottle-neck and some works have been undertaken either to reduce the time needed to reflect on a web crawl the changes within a web corpus, or to focus the web crawling on the most relevant changes first.

However, these efforts mainly address the issue to capture changes within a web corpus and to reflect them within the web crawl with the smallest delay.

They do not address the problem of initially building a new web corpus.

Web crawling remains a very slow process for at least the following reasons:

There is a limited crawl frequency authorized by "netiquette": In order to avoid overloading website with traffic linked to web crawlers, it is generally admitted that a crawler will access the same host website (or host) less frequently that once every 2.5 seconds. In addition, websites may enforce their own policy and may event refuse to serve a crawler that overpasses the admitted frequency. In such cases, the crawler maybe temporary or definitively barred to access the website again.

As mentioned earlier, websites generally take hundreds of milliseconds to seconds to answer a request.

The crawling process is not parallelizable. URLs found on a resource are often used to determine new resources to visit. In this case, resources cannot be downloaded in parallel and delays add up.

On top of that, even if a web corpus is needed in a narrow area the web crawling process should consider a very large amount of resource, including resources not related to this narrow area. The reason for this is that the crawling process is a non-selective one:

For applications where only a subset of the web is interesting, a crawl of the whole web is still required because interesting resources may be referenced by non-interesting resources. In other words, if uninteresting resources are filtered out, many interesting resources may be overlooked.

The decision whether a resource is interesting or not can only be taken after the resource has been crawled because the information provided by the resource's URL and the resource that references it is less than the information provided by the resource itself.

It could be possible to multiply the hardware resource to reduce the time needed to build a web crawl. However, this solution is not scalable and very costly. Also, as there exists dependencies between the tasks of the process, it will not be an entirely satisfactory solution in term of gain of time: even with infinite processing resources, it would take months to crawl a substantial portion of the web. This has been shown for example in the article "Accessibility of Information on the Web" of Steve Lawrence and C. Lee Giles, published in Nature vol. 400, pp. 107-109, 1999.

SUMMARY OF THE INVENTION

The object of the present invention is to alleviate at least partly the above mentioned drawbacks.

More particularly, the invention aims at building a web corpus in an efficient way, i.e. by fastening this building without requiring more hardware resources.

This object is achieved with a computer-implemented method for building a web corpus comprising the steps of:
sending by a web crawler a query to a reference web crawl agent, this query containing a least one identifier of a resource,
receiving by the web crawler a response from the reference web crawl agent;
if this response does not contain the resource identified by the identifier, downloading by the web crawler the resource from the website (WS) corresponding to the identifier, and adding the resource to the web corpus; and,
otherwise, if the response contains the resource identified by the identifier, adding this resource to the web corpus.

Preferred embodiments comprise one or more of the following features:

The reference web crawl agent builds responses according to the content of a reference web crawl.

If the reference web crawl agent determines that the resource is not contained within the reference web crawl, it initiates the downloading of the resource and its addition to the reference web crawl.

According to an embodiment, the method of the invention may further comprise steps of:
building a reference index from the reference web crawl,
sending by the web crawler an index query to the reference index,
receiving by the web crawler a response from the reference index, and
the step of sending of the query to the reference web crawl agent is done depending on the content of the response.

This embodiment may also comprise one or more of the following features:

The index query may contain an identifier of a resource, and if the response contains indexed information related to this resource, it may decide on whether to send a query to the reference web crawl agent according to the indexed information.

The index query comprises query criteria and the response of the reference index contains a list of identifiers.

The response of the reference index contains in addition indexed information corresponding to the identifiers.

The index query comprises an identifier, and the reference index sends a response containing a set of identifiers contained in the resource identified by this identifier.

The identifier can be a URL (Unified Resource Locator).

Another object of the invention is a web Crawler adapted to build a web corpus. It has means for:
sending a query to a reference web crawl agent, this query containing a least one identifier of a resource,
receiving a response from the reference web crawl agent;
if the response does not contain the resource identified by the identifier, downloading this resource from the website corresponding to the identifier and adding the resource to the web corpus; and
otherwise, if the response contains the resource identified by the identifier, adding this resource to the web corpus.

Further features and advantages of the invention will appear from the following description of embodiments of the invention, given as non-limiting examples, with reference to the accompanying drawings listed hereunder.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
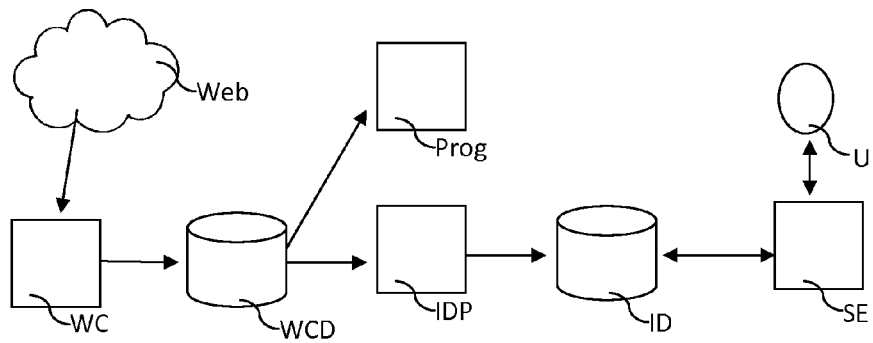
FIG. 1, already described, shows a functional architecture in which a web crawler could be deployed.
Figure 2:
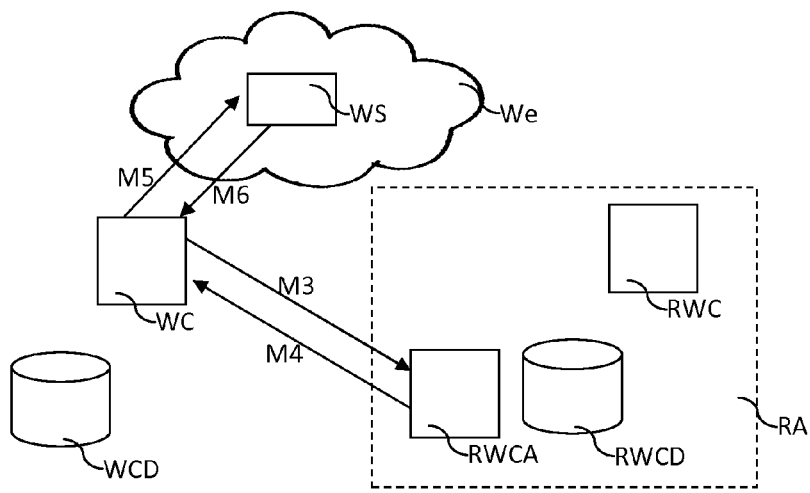
FIG. 2 shows a functional architecture enabling the deployment of the invention.

In the embodiment of the invention illustrated by FIG. 2, a reference area RA contains a reference web crawler RWC, a reference web crawl RWCD and a reference web crawl agent RWCA.

Such a reference web crawler RWC can be any web crawler, including those according to the state of the art. The word "reference" does not bring it any other characteristic than being a "reference" for the web crawler WC according to the invention.

The reference area RA has a functional or business meaning.

It may refer to the premises or servers beholding to a same company providing crawling services to other companies or to end users. As an example, the web crawler WC can be outside this reference area and uses interfaces let open by the company serving the reference area RA to access the reference web crawler agent RWCA.

The web crawler WC and the reference area RA can also behold to a same company. In such a case, the reference area RA can only have a functional meaning and separate the areas associated with each web crawlers WC, RWC. The reference area can (but not necessarily) deploy a legacy web crawler program.

The reference web crawler RWC can also be deployed according to the invention; the term "reference" will then only distinguish the functional relationships between them.

According to this embodiment, the reference area RA also includes a reference web crawl agent RWCA. This element is in charge of interfacing the web crawler WC and the reference web crawl RWCD. Notably it can take responsibility of any protocol conversion aspects when needed. It receives queries sent by the web crawler WC and sends back responses to it. These responses are built according to the content of a reference web crawl RWCD.

From an architecture point of view, the invention may only impact the addition of a reference web crawl agent RWCA to the reference area RA. All other functional elements of the reference area may be let unmodified and fully compliant with state-of-the art mechanisms.

This reference web crawler RWC can build a reference web crawl RWCD as described previously. More specifically, it recursively downloads resources from the web and identifies new resources to download by analyzing the content of the downloaded resources.

These downloaded resources can contain hyperlinks, which contains identifiers of a resource. These identifiers are usually URL (Unified Resource Locator), e.g. as specified by RFC 3986 of the IETF (Internet Engineering Task Force).

In the case the downloaded resource is a webpage, the identifiers take typically the form of URL embedded in HTML (HyperText Mark-up Language). An example for such an embodiment can be as:

<a href="resource1">link</a>

This language means that a word "link" is displayed in the webpage, with the emphasis corresponding to a hyperlink. This emphasis will show to the reader that she or he can click on this word to access to "resource1". The <href> keyword introduces the identifier of this "resource1" in the form of a URL.

The reference web crawler RWC can therefore parse the downloaded resource to identify all (or part) of these URLs and consider them as new resources to visit. It can schedule the visits and/or select only a part to visit according to some policies.

Downloaded resources can be added in the reference web crawl RWCD.

Figure 4:
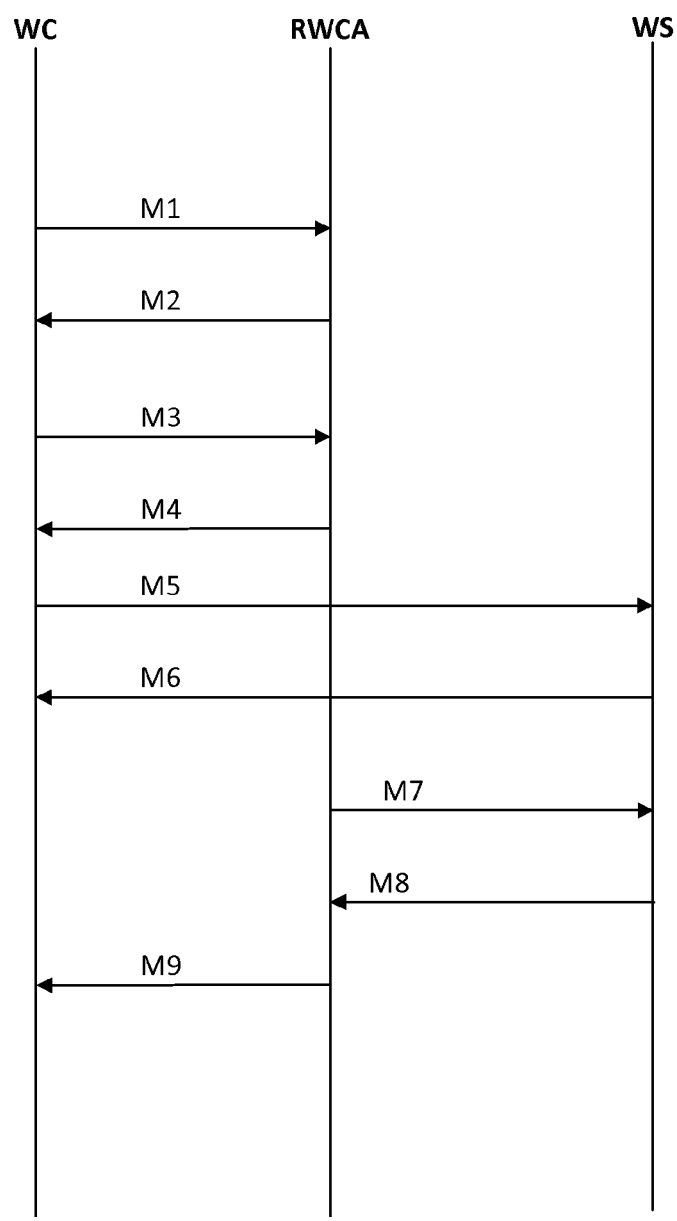
FIG. 4 and FIG. 5 show two time sequences illustrating various embodiments and options of the invention.

FIG. 4 illustrates the exchanges of messages between the elements involved in embodiments of the invention.

According to one aspect of the invention, the web crawler WC sends a query M1 to the reference web crawl agent RWCA.

This query M1 contains at least an identifier of a resource. This identifier can be a URL and the resource can be of any type, including webpage, multimedia file (video, photo, music . . . ), etc.

In the general case, the query M1 contains a list of URLs. However, for simplicity, the following description will be based on only one URL contained with the query. The extension from one to many URLs to handle is straightforward, as the different elements can simply handle them in sequence.

The reference web crawl agent RWCA can then check the reference web crawl RWCD in order to determine whether this URL corresponds to a resource already downloaded and added in this reference web crawl RWCD.

In this first situation, one assumes that the resource is found. Then the reference web crawl agent RWCA can insert the resource to the response M2 sent back to the web crawler WC.

When the web crawler WC receives this response M2, it can check its content. Here, it contains a resource, and it can assume that this resource is the one identified by the URL. It can then add it to the web corpus WCD.

One can see here that no web server has been queried, but the enrichment of the web corpus WCD has been performed by only copying the resource from a reference web crawl RWCD. This mechanism helps in reducing traffic over the internet, and reduces dramatically the time needed to build the web corpus since the response time of a reference web crawl is normally ways lower than the response time of a website.

In a second situation, the web crawler WC sends a second query M3 to the reference web crawl agent RWCA. This second query contains an URL of another resource.

As previously, the reference web crawl agent RWCA checks if this URL corresponds to a resource already downloaded and added in this reference web crawl RWCD. This time, however, one assumes that the resource has not been downloaded so far.

According to a first option, the reference web crawl agent RWCA can send back a response M4 containing no resource. The response M4 may contain a status indication representative of this lack of resource. For example, such a status indication may be a HTTP 204 status ("no content").

When the web crawler WC receives this response M4, it can check its content and determine that it does not contain the required resource and/or an error message.

According to an embodiment of the invention, in such a situation, the web crawler WC may send another query to another reference web crawl agent (not represented in the FIG. 2). Several reference web crawl agents (and reference areas) can be used by a web crawler WC. In such an embodiment, the reference web crawl agents can be queried sequentially until a response containing the resource is received, or in parallel. The parallel option provides with the advantage in reducing the mean time to get a response containing a resource, but increases the load of the reference web crawl agents.

If a response is received containing the resource, the web crawler WC can then act like previously when receiving the response M2

If the web crawler WC has not received any response containing a resource (in the situations where several or only one have been queried), this can trigger the downloading by the web crawler WC of this resource from the website WS corresponding to the URL.

The downloading of a resource knowing its URL is performed by the web crawler according to state-of-art mechanisms. Simply stated, it consists in sending a request M5 to the website WS corresponding to the URL, and receiving a response M6 from this website WS, containing this resource.

Figure 3:
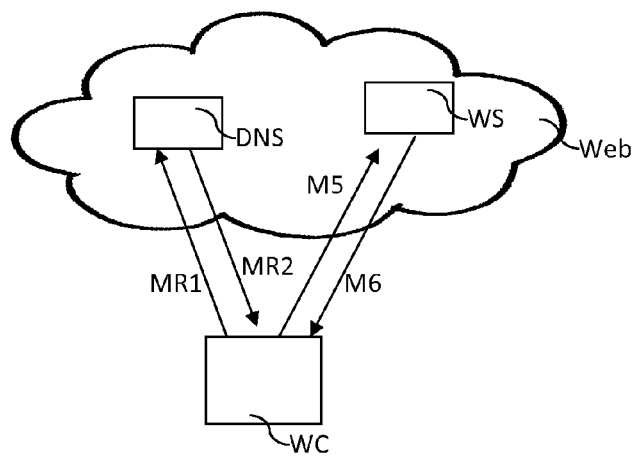
FIG. 3 illustrates how a resource is usually retrieved from the web according to the state of the art.

The FIG. 3 shows with more details how the web crawler WC can access to a resource of the web knowing its URL.

As any client of the internet, the web crawler WC is configured with the address(es) of one (or more) DNS (Domain Name Server).

It first sends a request MR1 to this DNS (or the first one of a list of DNS) with the URL as a parameter. The DNS is dynamically configured to associate URLs of resources with IP addresses of websites where this resource can be found. It replies to this request with a message MR2 containing a list of IP addresses corresponding to the requested URL.

Then, the web crawler WC can send a HTTP request (HyperText Transfer Protocol) M5 as defined by RFC 2616 of the IETF, to the website WS identified by one of the IP address of this list. This request is typically a GET request, and it contains the URL.

The HTTP server associated to the website WS sends a response M6 to this request, containing the resource identified by this URL.

The web crawler WC can then add this resource to its web corpus WCD.

According to a second option, instead of sending back a message M4 with no resource and/or an indication of error, the reference web crawl agent RWCA can initiate the downloading of the requested resource.

This downloading can be performed by the reference web crawl agent RWCA itself, or inserted in the list of resources to download by the reference web crawler RWC.

In these situations, a response can be sent back to the web crawler WC to inform it that its query is being processed and that it may expect another response containing the resource, once it has been downloaded from the website WS. This provisory response can contain a status information representative of this situation. Such a status information may for example be a HTTP 202 status. When receiving such a provisory response, the web crawler can wait until the full response is received or download the resource itself from the website WS.

On the reference web crawler side, the resource is then downloaded from the website WS corresponding to the URL as previously explained: it sends an HTTP request M7 to the website, which reply by a response M8 containing the resource.

The resource can be added to the reference web crawl RWCD or not according to the own policies of the reference web crawler RWC. These policies are beyond the scope of the invention.

The reference web crawl agent RWCA can then send a response M9 to the web crawler WC, containing this resource. The web crawler WC can then act like in the situation explained above in relation with the receipt of the message M2.

This second option has the advantage over the first option to make the reference web crawler RWC knowledgeable about other parties' queries. Especially in the case where the reference web crawl RWCD is used by several web crawlers WC, it may take benefit of being instructed to downloaded resources to enrich its own reference web crawl RWC.

This could be particularly useful when the reference web crawl RWCD forms a generalist web corpus that is used by more specific web crawlers WC. It can then be enriched with more specific content thanks to specialized niche business players.

In the situation where the reference web crawler RWC and the web crawler RC are not beholden by the same company, this behavior provides advantage to both parties in term of knowledge management.

According to an embodiment of the invention, the queries M1, M3 sent to the reference web crawl agent RWCA can contain additional parameters than the identifiers (URLs). In particular, they can contain an age constraint that specifies the maximum time since the resource was last downloaded from the web.

If the resource in the reference web crawl RWCD that corresponds to the URL was downloaded less recently that the age parameter inside a query M1, M3, then the reference web crawl agent can consider that the resource has not been found in the reference web crawl RWCD. It can then initiate any of the previously described options, like downloading it from the website WS or sending back an error message, (i.e. the behavior may be similar as if the resource were not contained in the reference web crawl RWCD)

Figure 5:
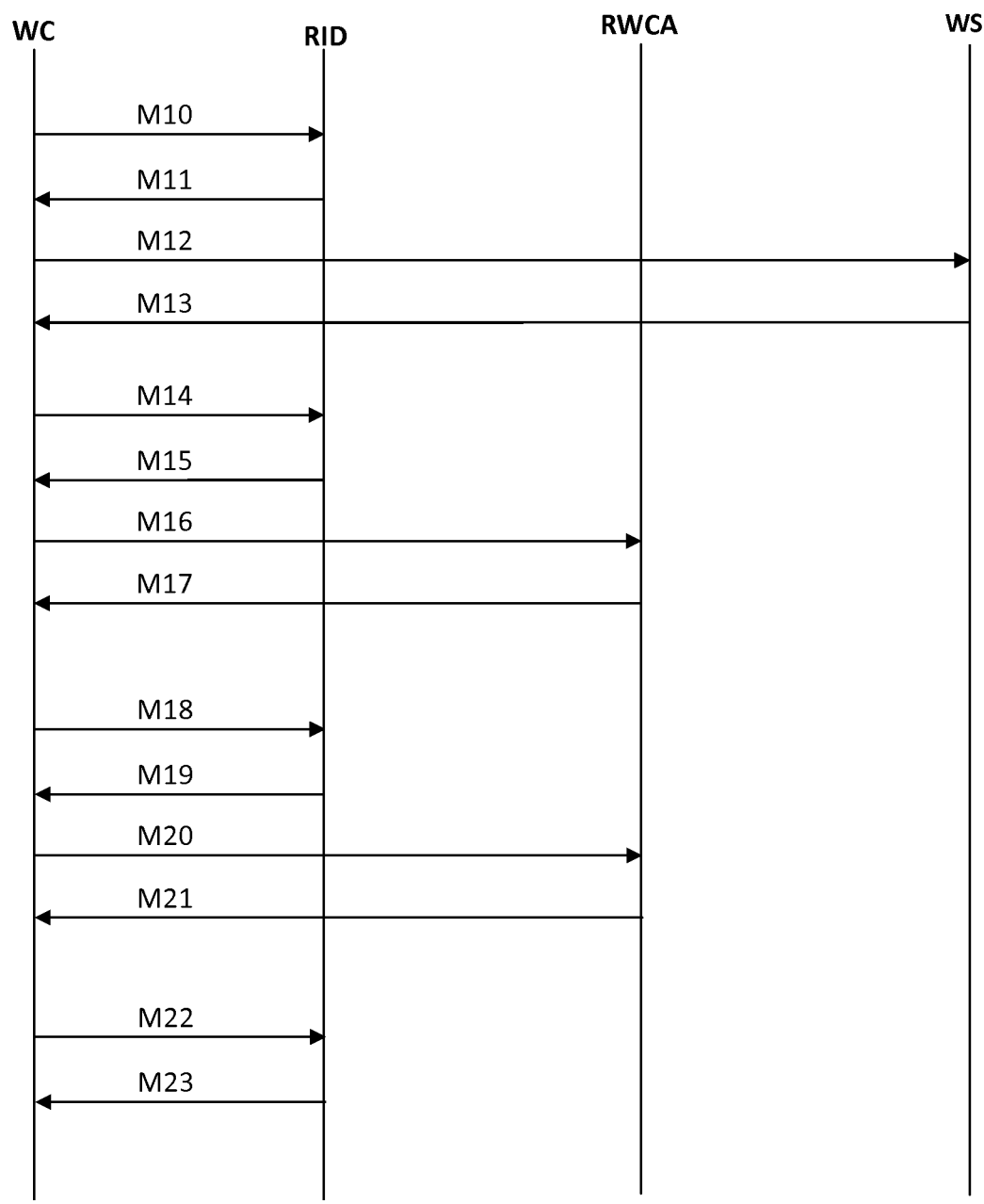

FIG. 5 shows another embodiment of the invention, wherein the web crawler WC makes use of a reference index RID. The term "reference" simply means that this index is built from the reference web crawl RWCD and is part of the reference area RA.

According to a mechanism known in the art, an indexing program uses the reference web crawl RWCD to build this reference index RID. The content and the format of the information within the reference index are out of the scope of this invention. The reference index can be any index of the state of the art.

It may be an index provided by companies acting in this field, like Google, Microsoft or Exalead, etc.

The reference index RID should here be understood as being partly an information repository and the program needed to process and answer to queries sent by clients.

According to an embodiment of the invention, prior to sending a query to the reference crawl agent RWCA, the web crawler WC can send an index query to the reference index RID. In such an embodiment, the sending of queries to the reference web crawl agent may then be decided depending on the content of the responses received in relation with these index queries.

Several options are possible.

Referring back to FIG. 5, according to a first option, an index query M10 is sent to the reference index, containing one (or several) URL.

In a first situation, the reference index RID does not contain any information about the requested URL. It then sends a response M11 back to the web crawler WC indicating that the URL is not indexed.

It should be noted that since the reference index is obtained from the reference web crawl RWCD, it means that the resource has not been downloaded and added to this reference web crawl.

The web crawler WC can then download the resource identified by this URL from the website WS corresponding to this URL. It sends a message M12 to the website WS and receives the resource within a response M13.

In a second situation, the reference index RID contains indexed information relative to the URL. It then sends a response M15 replying to the index query M14, containing information which may be all or part of the indexed information related to the URL (in the general case, only a part of the indexed information is transmitted).

The sent information within the index response may comprise a description of the resource: tags, keywords, information fields, but also an excerpt or a digested version of the resource. As said before, for a webpage, the indexed information can comprise a version of the page without advertisement banners, images etc. For a video resource, the indexed information can comprise a textual description of the video only, etc.

According to an embodiment of the invention, the web crawler WC can take a decision about the opportunity to try to add the resource to the web corpus WCD on the basis of this index response.

This decision can be taken according to whether the resource relates to the web corpus WCD that the web crawler is intended to build. For instance, if the web crawler WC is building a web corpus related to a given theme, it may not want to add a resource to this web corpus if the reference index returns hints that the resource does not correspond to this theme.

In a situation where, from the index response, the web crawler WC decides of a positive interest in the corresponding resource, it sends a query M16 to the reference web crawl agent RWCA, containing the URL, as it was previously described. When it receives the response M17 containing the resource, the resource is added to the web corpus WCD.

In a situation where, from the index response, the web crawler WC decides that it has no interest in the corresponding resource, the process can end here, and no message M16 are sent to the reference web crawl agent RWCA. The web crawler can then handle another URL.

According to another option, an index query M18 is sent to the reference index RID containing query criteria, according to a query language. This query language could be a complex one or a simple one (for instance, a list of keywords linked with Boolean connectors).

This option is particularly relevant when the web corpus to be built is a specific web corpus relating to a given theme. These queries may filter resources related to this theme.

The reference index RID may answer to such a request by sending information matching the query criteria. More particularly, the response M19 may contain a list of URL corresponding to resources matching the query criteria or a list of these URL associated with indexed information of the resources corresponding to the URLs.

In the first case, the web crawler WC may need to send a query M20 for every URL contained with the received list.

In the second case, the web crawler may use the received indexed information in order to determine whether or not it is interested in querying each of the resource. It may then send a query M20 for each, for a part or for none of the URLs of the received list. It receives responses M21 corresponding to the queried URLs.

Another option consists in enabling the web crawler to query for a list of URLs contained within a resource without querying for this resource itself.

The web crawler WC sends an index query M22 to the reference index RID containing a URL and an indicator.

Recognizing this indicator, the reference index RID will distinguish between this index query M22 and a "normal" index query like the index queries M10, M14 previously described. The reference index RID will look whether it contains indexed information related to this URL as previously.

In a preferred embodiment of this option, the indexed information contains information about the URL (hyperlinks) contained by the resource. This information could have been retrieved by parsing the resource when building the reference index RID. In this embodiment, the reference index RID can answer quickly to the index query without necessitating any processing or further parsing of the resource. In case such indexed information is found, it will send a response M23 containing these URLs (if any).

The web crawler WC can then use these URLs to any types of subsequent queries: querying the resources identified by these URLs to the reference web crawl agent RWCA, querying the reference index RID to get further URLs without getting the resources themselves etc.

This type of request is useful to avoid adding unnecessary resources to the web corpus WCD, in the situation where one resource is not interesting for this corpus (not related to the theme, etc.) but may still contain hyperlinks to other resources that may be interesting.

A same web crawler can implement one or several of these options and make use of them according to its algorithm to discover the web and build the web corpus in the most efficient way.

The invention has been described with reference to preferred embodiments. However, many variations are possible within the scope of the invention.

While this invention has been particularly shown and described with references to example embodiments thereof, it will be understood by those skilled in the art that various changes in form and details may be made therein without departing from the scope of the invention encompassed by the appended claims.

The invention claimed is:

1. A computer-implemented method for building a web corpus (WCD), the method comprising the steps of:
providing to a web crawler (WC) a query containing a list of several URLs, each URL identifying a respective resource to be included in the web corpus (WCD) to be built, the web corpus being a set of resources that corresponds to a web crawl, the web crawl being a repository of downloaded resources, the resources of the repository being downloaded by visiting corresponding URLs, each URL identifying a respective resource to be downloaded;
providing one or more reference web crawl agents (RWCA), each reference web crawl agent acting as an interface between the web crawler and a respective reference web crawl (RWCD), each reference web crawl being distinct from the web corpus to be built,
for each URL in the query:
sending by the web crawler (WC) the URL to at least one of the one or more reference web crawl agents (RWCA);
by said at least one of the one or more reference web crawl agents (RWCA):

checking if said URL identifies a resource already downloaded in the respective reference web crawl (RWCD);
building a response, where:
if the checking has a positive result, then the response contains the resource identified by said URL, else
if the checking has a negative result, then:
the response does not contain the resource identified by said URL, or
said at least one of the one or more reference web crawl agents (RWCA) initiates the downloading of the resource and said resource is added to the respective reference web crawl (RWCD), and the response contains the resource identified by said URL;
sending to said web crawler (WC) the response;
upon receiving by said web crawler (WC) said responses from said at least one of the one or more reference web crawl agents (RWCA):
if no response contains the resource identified by said URL, downloading by said web crawler (WC) said resource from a website (WS) corresponding to said URL and adding said resource to said web corpus (WCD), otherwise if a response contains the resource identified by said URL, adding said resource to said web corpus (WCD) to be built, the adding being performed without querying a web server.

2. The computer-implemented method according to claim 1, further comprising steps of:
building a reference index (RID) from said reference web crawl (RWCD),
sending by said web crawler (WC) an index query to said reference index (RID),
receiving by said web crawler (WC) a response from said reference index, and
wherein the sending of said query to said reference web crawl agent (RWCA), is done depending on the content of said response.

3. The computer-implemented method according to claim 2, wherein said index query contains an identifier of a resource, and wherein if said response contains indexed information related to said resource, deciding on whether to send a query to said reference web crawl agent (RWCA) according to said indexed information.

4. The computer-implemented method according to claim 2, wherein said index query comprises query criteria and said response of said reference index contains a list of identifiers.

5. The computer-implemented method according to claim 4, wherein said response of said reference index contains in addition indexed information corresponding to said identifiers.

6. The computer-implemented method according to claim 2, wherein said index query comprises an identifier, and wherein said reference index sends a response containing a set of identifiers contained in the resource identified by said identifier.

7. A Web Crawler (WC) apparatus adapted to build a web corpus (WCD) having a processor configured to:
receive, at the web crawler, a query containing a list of several URLs, each URL identifying a respective resource to be included in the web corpus (WCD) to be built;
provide one or more reference web crawl agents (RWCA), each reference web crawl agent acting as an interface between the subject web crawler and a respective reference web crawl (RWCD), each reference web crawl being distinct from the web corpus to be built, the web corpus being a set of resources that corresponds to a web crawl, the web crawl being a repository of downloaded resources, the resources of the repository being downloaded by visiting corresponding URLs, each URL identifying a respective resource to be downloaded;
for each URL in the query:
send by the web crawler (WC) the URL to at least one of the one or more reference web crawl agents (RWCA);
by said at least one of the one or more reference web crawl agents (RWCA):
check if said URL identifies a resource already downloaded in the respective reference web crawl (RWCD);
build a response, where:
if the checking has a positive result, then the response contains the resource identified by said URL, else
if the checking has a negative result, then:
the response does not contain the resource identified by said URL, or
said at least one of the one or more reference web crawl agents (RWCA) initiates the downloading of said resource and said resource is added to the respective reference web crawl (RWCD), and the response contains the resource identified by said URL;
send to said web crawler (WC) the response;
upon receiving by said web crawler (WC) said responses from said at least one of the one or more reference web crawl agents (RWCA):
if no response contains the resource identified by said URL, download by said web crawler (WC) said resource from a website (WS) corresponding to said URL and add said resource to said web corpus (WCD), otherwise if a response contains the resource identified by said URL, add said resource to said web corpus (WCD) to be built, the adding being performed without querying a web server.

* * * * *